United States Patent [19]
Henzel et al.

[11] 3,909,044
[45] Sept. 30, 1975

[54] TRAILER HITCH

[76] Inventors: George M. Henzel, 501 Henrich Dr., Kettering, Ohio 45429; John H. Henzel, 10800 Elmwood, Cleveland, Ohio 44125

[22] Filed: Nov. 18, 1974

[21] Appl. No.: 524,559

[52] U.S. Cl. .......... 280/432; 180/103; 200/DIG. 19; 303/7
[51] Int. Cl.² .......................................... B60T 7/20
[58] Field of Search ......... 280/432, 446 B; 180/103; 303/7; 200/DIG. 19

[56] References Cited
UNITED STATES PATENTS

| | | | |
|---|---|---|---|
| 2,464,592 | 3/1949 | Leathers et al. | 200/DIG. 19 |
| 3,005,643 | 10/1961 | Dugan et al. | 280/432 |
| 3,036,845 | 5/1962 | Till | 280/432 |
| 3,288,240 | 11/1966 | Franzel | 180/103 X |
| 3,430,986 | 3/1969 | Long | 280/432 |
| 3,566,987 | 3/1971 | Franzel | 180/103 |
| 3,719,246 | 3/1973 | Bott | 180/103 |
| 3,758,165 | 9/1973 | Savelli | 180/103 |
| 3,790,807 | 2/1974 | Rossigno | 303/7 |
| 3,810,521 | 5/1974 | Sparr | 180/103 |

*Primary Examiner*—Leo Friaglia
*Attorney, Agent, or Firm*—Arthur L. Cain

[57] ABSTRACT

A device rendering a semitractor-trailer arrangement resistant to jackknifing through a gyroscopic action activating braking mechanisms upon detection of sudden sideways, i.e., lateral, movement of the trailer relative to the tractor. Alternative operation is provided for vehicle start-up and normal traffic maneuvering without affecting the gyroscopic movements and thus the braking mechanism. A variety of alternate braking mechanisms activated by the gyroscope and causing the desired results are disclosed.

15 Claims, 15 Drawing Figures

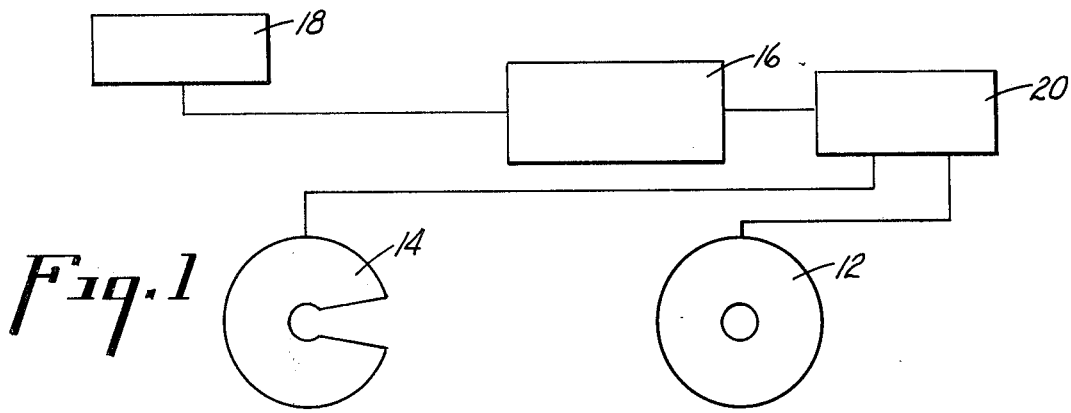
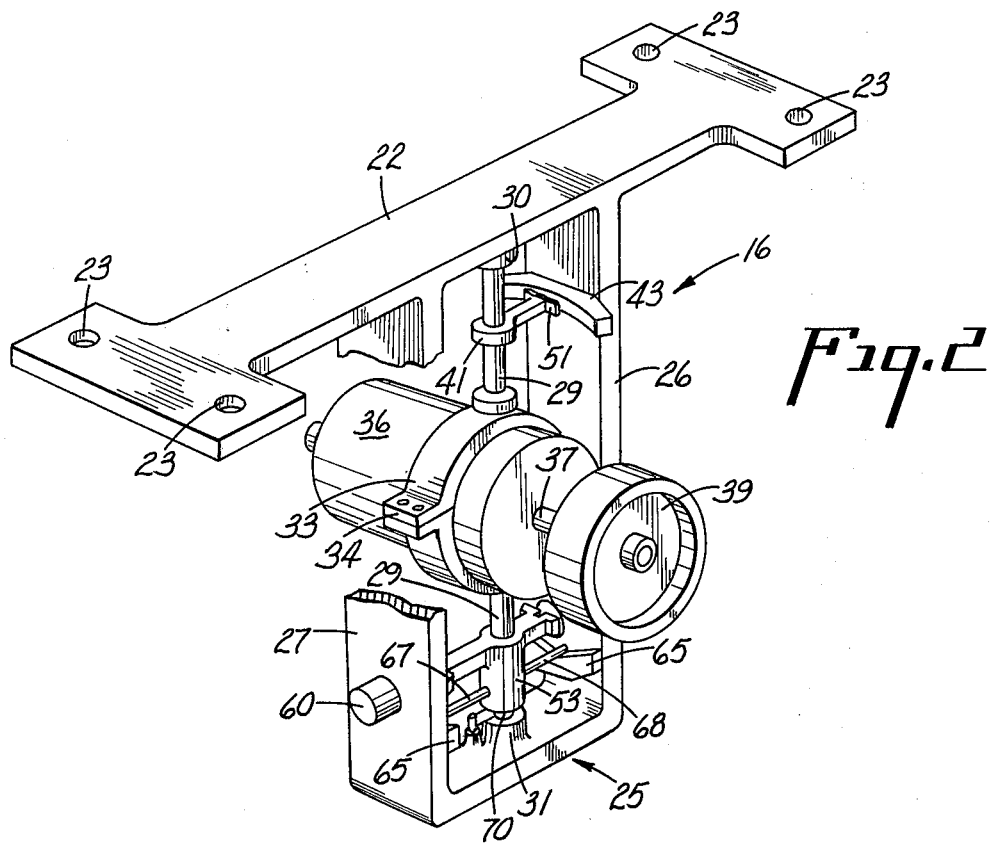
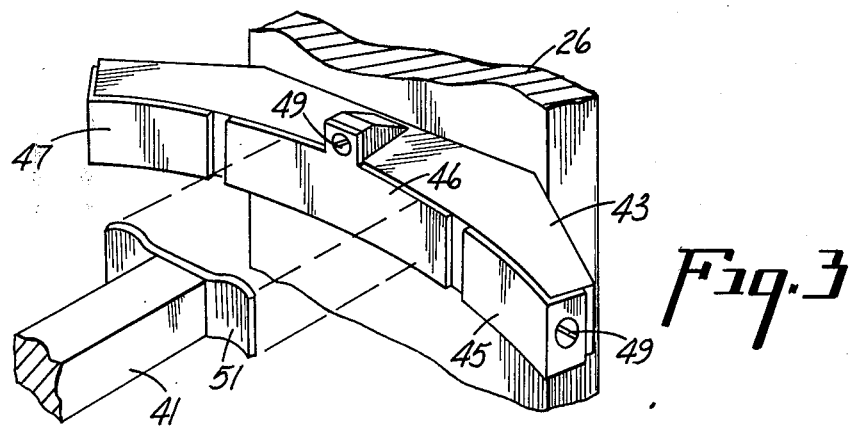

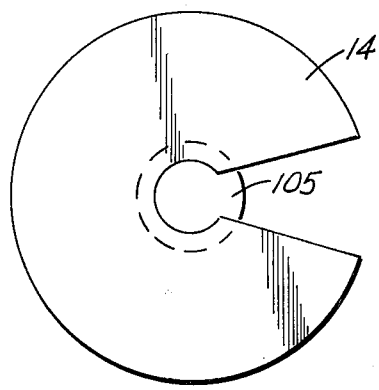
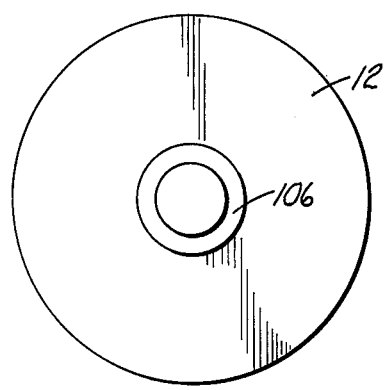
Fig.8  Fig.8a
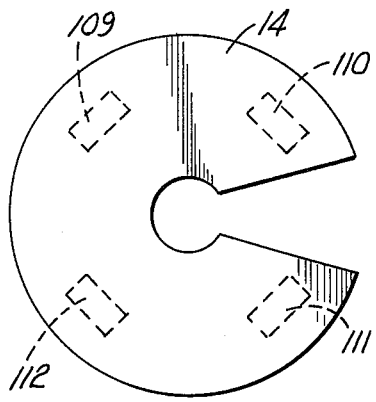
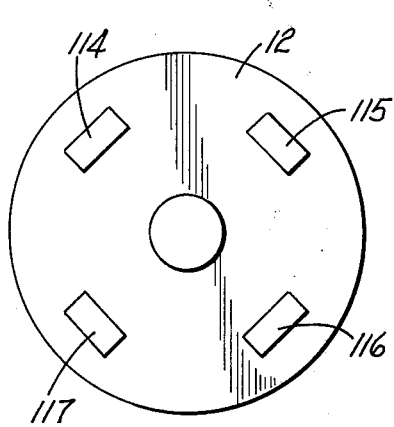
Fig.9  Fig.9a
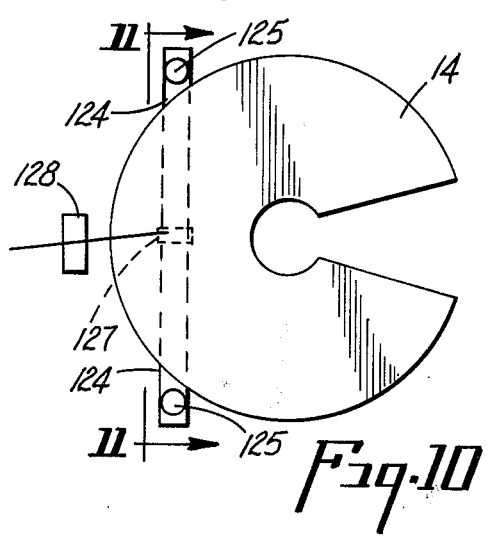
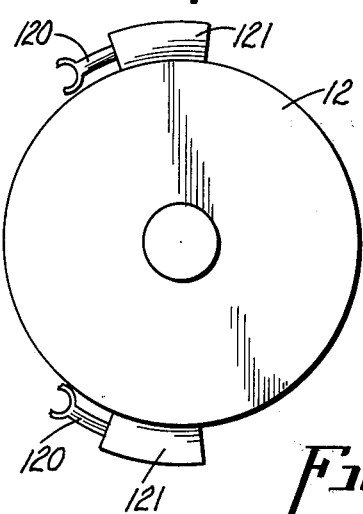
Fig.10  Fig.10a
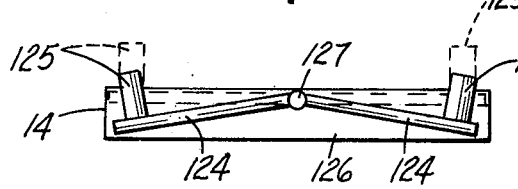
Fig.11

TRAILER HITCH

BACKGROUND OF THE INVENTION

1. Field of the Invention

This invention relates in general to an improved hitching mechanism for trailers, and, more particularly, to a hitch for semitractor-trailers which alleviates jackknifing of the trailer due to sudden, undesired lateral movements of the trailer.

2. Description of the Prior Art

Ever since trailers came into use, there have been serious problems with respect to maintaining substantial control between the trailer and the vehicle supplying the motivation. In this regard, jackknifing; i.e., the trailer being positioned at an angle other than 180° relative to the motivating vehicle, too often occurs and results in loss of control of the vehicle.

As tractor-trailer combinations, sometimes referred to as semitractor-trailers, became more prevelant on the highways, the problem of jackknifing grew enormously. Various suggestions for controlling the movements of the trailer relative to the tractor have been advanced.

Some of the more elementary suggestions involved mechanically locking the trailer in a fixed position relative to the tractor. In this manner, the trailer could be locked at an angle other than 180 degrees for assisting in backing the tractor and trailer. When the trailer was to be transported over the open road for extended distances, the trailer could be locked at an angle of 180 degrees relative to the tractor and thus excessive sideway movement was prevented. Of course, these suggestions were for the most part impractical as a total solution to the problem.

A more sophisticated solution involves the reliance upon hydraulic fluid to restrain movements of the trailer. Generally, in these devices, any movement of the trailer causes an hydraulic piston to move within a cylinder. Relatively slow movements occur due to the low resistance of the fluid, but when the movement becomes sudden or extreme the hydraulic pressure suppresses further movement. All of these devices require operator activation of the device, usually from within the tractor operator compartment. This was, of course, impractical as operator foresight was the major variable which was desired to be eliminated.

Further, in regard to hydraulically controlled systems, in many such devices activation includes operator involvement through positive, physical movement of the steering mechanism. Obviously, these systems leave much to be desired to achieve a totally efficient system.

Another stage in the development of antijackknifing devices again involved direct operator intervention. One such device utilized a sensor which was energized by the operator upon becoming aware of the impending or possible jackknifing of the trailer. Mechanical braking of trailer movement was automatic after energization of the sensor. A second such device caused mechanical braking upon manual operation of a hydraulically assisted lever. Yet another device provided for an alternate mounting position for the trailer, specifically for long-distance hauling as opposed to close-quarter maneuvering. The object of this last solution was to affect a change of center of gravity and thus eliminate undesired movement.

But, again, these solutions all required foresight and judgment in situations usually allowing insufficient time for such luxuries.

Finally, one prior art solution involved electromagnets which were activated by the brake lights of the tractor vehicle and resulted in a braking action by causing an attracting force between a portion of the tractor and a portion of the trailer. As in many of the other concepts, in this case operator awareness of the impending, possible emergency is required.

Clearly, in real life, pre-awareness of the danger of jackknifing is almost always lacking. Further, research has shown that when a trailer has a heavy load midway, relative to the length of the trailer, unless any undesired movement is stopped within the first few degrees of deviation, attempted correction thereafter is to no avail. Therefore, due to the normal reaction time of an operator who has perceived impending danger, dependency on the actions of the operator is a totally impractical solution to the problem.

SUMMARY OF THE INVENTION

The primary object of this invention is to provide an improved hitching mechanism for the trailer of a tractor-trailer rig.

Other objects of this invention include the provision of an improved trailer hitch which does not require direct actions of an operator; which does not rely upon physical functions of the tractor or motivational vehicle for energization; which is not dependent upon human reaction time; and, which is wholly self-operative upon sudden, substantial lateral movement of the trailer relative to the tractor.

Still other objects of this invention include the provision of a new and improved hitch for trailers which does not interfere with maneuvering of the trailer at slow speeds and relatively tight confines; which is automatically energized to operate once the vehicle has reached a more or less steady state speed on the open road; and which immediately reacts to undesirable movements of the trailer relative to the tractor to restrain the same and prevent upsetting of the trailer.

Further objects of this invention include providing for a new and improved trailer hitch for semitractor-trailer combinations in which a variety of mechanical braking devices are readily adaptable to a central control system for detecting movements of the trailer; which incorporates a chosen, allowable tolerance for trailer movements after which corrective reaction is immediately automatic; which disables the detection and resulting reaction of trailer movements when close-quarter maneuvering is desired; and which contemplates physically locating the detection device on a portion of the trailer.

Other objects of this invention include the provision of a new and improved hitch for trailers which utilizes a gyroscopic device to detect movements of the trailer relative to the tractor; which has a detector spring biased to a specified degree in order to disregard movement caused by normal weaving or swaying; and which completes an electrical circuit when the detector indicates trailer movements beyond acceptable limits.

Still further objects of this invention include providing for a new and improved trailer hitch for semitractor-trailers having a fifth-wheel arrangement with mechanical braking means which is electrical solenoid operated; which may be additionally activated by air pressure controls; which contemplates electromagnetically causing friction within the fifth-wheel components; and which contemplates leverage operated frictional devices between components of the fifth-wheel.

A still further object of this invention is to provide a new and improved trailer hitch which obtains one or more of the objects and advantages set forth above.

These and other objects and advantages of this invention will become apparent from the following description thereof, in view of the accompanying drawings.

BRIEF DESCRIPTION OF THE DRAWINGS

FIG. 1 is a block diagram of the components of the improved trailer hitch;

FIG. 2 is a perspective view of the detector portion of the trailer hitch of the present invention;

FIG. 3 is a perspective view enlarged, of a portion of the detector of FIG. 2;

FIG. 7 is a partial cross sectional view of the fifth-wheel, trailer portion, taken along line 7—7 of FIG. 5a;

FIG. 8 is a plan view of a second structure for use with this invention showing the tractor portion of the fifth-wheel;

FIG. 8a is a plan view of the fifth-wheel structure, shown in FIG. 8 showing the portion on the trailer;

FIG. 9 is a plan view of a third structure for use with this invention showing the tractor portion of the fifth-wheel;

FIG. 9a is a plan view of the fifth-wheel structure shown in FIG. 9 showing the portion on the trailer;

FIG. 10 is a plan view of a fourth structure for use with this invention showing the tractor portion of the fifth-wheel;

FIG. 10a is a plan view of the fifth-wheel structure, shown in FIG. 10 showing the portion on the trailer; and FIG. 11 is a cross sectional view of the fifth-wheel, tractor portion, taken along line 11—11 of FIG. 10.

DESCRIPTION OF THE PREFERRED EMBODIMENTS

Figure 4:
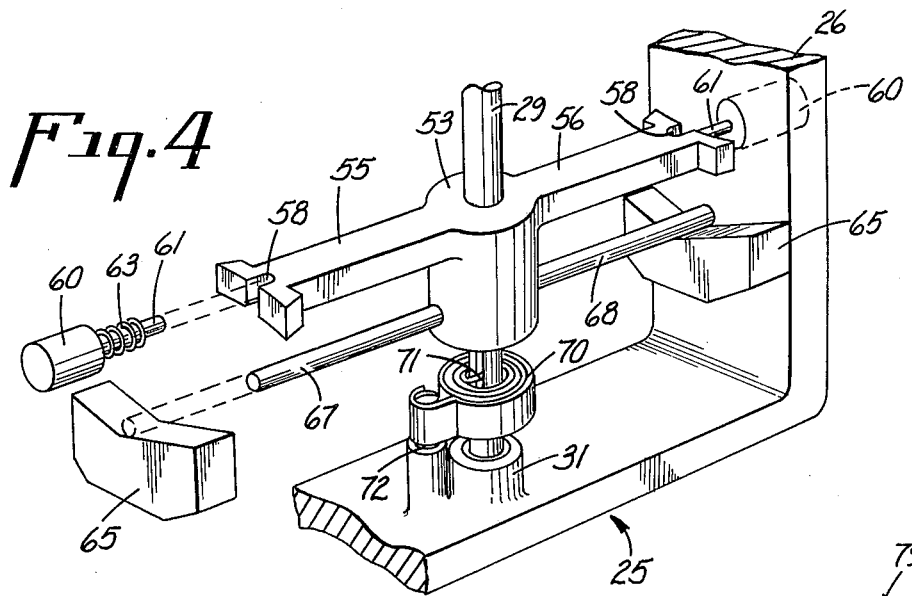
FIG. 4 is a perspective view, enlarged, of another portion of the detector of FIG. 2.

This invention concerns what has come to be known as semitractor-trailer rigs. A truck or tractor is attached to a trailer by means of a fifth-wheel, so named because of its relation to the tractor portion of the rig. The trailer generally has two or more wheels at one end of its extended length and a trailer portion of the fifth-wheel at the opposite end. This trailer portion of the fifth-wheel is indicated generally at 12 in FIG. 1. The tractor or truck includes a portion of the fifth-wheel indicated generally at 14, which is constructed so as to correspond to and mate with the trailer portion 12.

The connection of the truck and trailer by means of the mating of the fifth-wheel portions 12 and 14 is both releasable and rotatable. In this manner, once the trailer is attached to the tractor, rotation of the trailer is possible to a large extent to permit maneuvering of the vehicle. As noted above, while movement of the trailer relative to the tractor in close quarters or at lower speeds is not only acceptable but desirable, the opposite is true when long-haul, high-speed transporting is concerned.

In this respect, it is preferred that some method of restraining lateral rotation of the trailer relative to the tractor be provided for high speed travel. FIG. 1 illustrates, in block diagram, such a method. A detector for determining when the trailer moves relative to the tractor is shown generally at 16. A power supply, shown generally at 18, supplies the electrical power necessary to operate the detector. This power supply 18 may be the same supply which operates the tractor itself.

Finally, a mechanical braking device, illustrated generally at 20, functions to restrain rotational movement of the trailer upon an appropriate signal from the detector 16. A variety of acceptable braking devices are discussed at a subsequent portion of this disclosure.

FIG. 2 illustrates the detector 16 in detail. A frame 22 serves to support the detector 16 and is provided with appropriate means, such as apertures 23, for mounting the detector 16 to the trailer. The frame 22 includes, as an integral portion thereof, a U-shaped bracket 25 having side walls 26 and 27.

Within the U-shaped bracket 25, a shaft 29 is mounted in bearings 30 and 31 in such a manner as to be generally vertical. The shaft 29 is discontinuous at its center at which point a gimbal style cradle 33 is attached. The cradle 33 is formed from two semicircular portions, thus forming a generally circular opening in the middle thereof. The cradle is provided with suitable means 34 for clamping the two semicircular portions together. Thus, the shaft 29 and cradle 33 are generally able to rotate in the bearings 30 and 31 within the U-shaped bracket 25.

An electrically operated motor 36 is mounted within the cradle 33 by reason of tightly securing the clamping means 34 about the casing of the motor 36. This motor 36 is operated by the power supply 18, above-mentioned and appropriate electrical connections are provided therefor (not shown). The motor 36 has an output shaft 37 to which a flywheel 39 is attached. It should be noted that more than one flywheel may be utilized, since the weight and quantity of flywheels is dependent upon the size and weight of the trailer.

The motor 36 and flywheel 39, which rotate on the shaft 29, operate in a gyroscopic fashion to maintain a plane of rotation. In this respect, the energized motor 36 and rotating flywheel 39 will tend to remain in the identical relative position, even though the frame 22 turns due to the trailer moving. When this occurs, the shaft 29 rotates within the U-shaped bracket 25. This rotation of the shaft 29, and the corresponding rotation of the motor 36 and flywheel 39, may be utilized to indicate when and to what degree the trailer moves relative to the tractor.

For the purpose of detecting movements of the trailer, an arm 41 is secured to the shaft 29, in this case above the cradle 33. The position of the arm 41 is fixed by any suitable fastening device (not shown) so that its free end projects towards the side 26 of the U-shaped bracket 25. Interposed between the arm 41 and the side 26 is a striker bar 43. The striker bar 43 is securely fastened to the side 25 by any suitable means (not shown) such as welding or bolting.

The details of the striker bar 43 and arm 41 are more readily apparent with the aid of FIG. 3. The striker bar 43 has securely fastened to the outwardly facing surface thereof three separate electrically conductive strips 45, 46 and 47, respectively. Materials such as copper, brass or bronze may be used for the conductive strips. It is extremely important that the conductive strips 45, 46 and 47 be completely, electrically insulated from one another. For this reason, the striker bar 43 should be constructed of an electrically insulating material. The conductive strips 45, 46 and 47 are attached to the striker bar by means of suitable fastenings means such as screws 49 (only two shown). The screws 49 may additionally be utilized to make electrical connections to each of the conductive strips 45, 46 and 47 as will appear further from the subsequent discussions herein.

The free end of the arm 41 includes an electrically conductive spring brush 51. Again, the brush may be constructed of a material such as copper, brass or bronze. The dimensions of the arm 41 and striker bar 43 are designed so that the brush 51 contacts at least one of the conductive strips 45, 46 or 47. The length of the brush 51 is such that it is shorter than the intermediate conductive strip 46. The conductive strip 46 is designed so as to have a length corresponding to the normal angle of the trailer to the tractor when being drawn around a 90 degree change in direction. Thus, an acceptable tolerance of trailer movement is provided by consideration of the difference by which the length of conductive strip 46 exceeds brush 51. As is readily apparent, the screws 49 holding the conductive strips 45, 46 and 47 in place should be positioned so that the brush 51 does not contact them and cause excessive wearing of the brush.

When the trailer either is not moving relative to the tractor or any such movement is only normal swaying or turning, the brush 51 will be positioned in contact only with conductive strip 46, as indicated by the phantom lines in FIG. 3. However, when the motor 36 is operating, the gyroscopic effect will tend to keep the shaft 29, and thus the arm 41, stationary while the trailer and the frame 22 rotate as noted above. As the frame 22 rotates, the brush 51 will bridge two conductive strips; i.e., either 45 and 46 or 46 and 47, depending upon which way the trailer rotates, with respect to the tractor.

Independent electrical connections (not shown) lead from each of the conductive strips 45, 46 and 47 to the braking device 20. When the brush 51 bridges two of the conductive strips as noted above, a circuit is completed and the braking mechanism 20 is activated to effect the desired control as further described hereinafter.

In some instances; i.e., rough terrains physically and/or corrosively, the use of more than one arm 41, brush 51 and striker bar 43 may be desirable in order to optimize efficiency of the detector 16. In such a case, the principles herein are readily adaptable.

Special arrangements must be made for start-up of the motor 36. Since, when the motor 36 is energized initially the torque would cause the shaft 29, and thus the arm 41, to rotate and complete a circuit to the braking mechanism, rotation of the shaft should preferably be restrained at this time. For this reason, a hub 53 is positioned on the shaft 29, in this case, below the cradle 33. This portion of the detector 16 is more effectively illustrated in FIG. 4.

The hub 53 is fixedly attached to the shaft 29 and rotates with the shaft. The hub 53 includes integral levers 55 and 56 which extend to the very immediate vicinity of the sides 27 and 26, respectively, of the frame 22. The free ends of the levers 55 and 56 are slotted as indicated at 58. The sides 27 and 26 of the frame 22 have positioned correspondingly, with respect to the slots 58, a solenoid 60 with a plunger 61 in each of them. The dimensions of the plunger 61 are such that, except upon activation of the solenoid 60, the plunger 61 from each solenoid 60 remains in the slot 58 in each lever 55 and 56 and prevents rotation of the hub 53 as well as the shaft 29. Each plunger 61 is biased by a spring 63 to remain in place in the slot 58 until energization. Of course, once the motor 36 has reached operating speed, each solenoid 60 is energized and the plunger 61 removed from the slot 58.

Another problem to be averted concerns the extent of rotation of the shaft 29. It is only desired that the cradle 33, and consequently the arm 41, rotate far enough to activate the braking mechanism 20. For this reason, a limiting means is included in the detector 16 and shown in detail in FIG. 4. A limiting block 65 is provided on each side 26 and 27 of the frame 22. Each limiting block 65 is attached to the sides 26 and 27 by suitable means such as welding or bolting (not shown).

Arranged to extend from the hub 53, and generally parallel to the levers 55 and 56, are rods 67 and 68, respectively. These rods 67 and 68 are attached to the hub 53 and rest on the upper surface of the limiting blocks 65. The upper surface of the limiting blocks 65 is beveled in a manner resulting in the center being at a lower point than the outside edges.

The shaft 29 is further provided with a coiled tension spring 70, attached to the shaft 29 by suitable means, such as a portion of the spring extending through a slot in the shaft, as indicated at 71. The remaining end of the coiled spring 70 is secured to the frame 26, such as by reason of the loop around a stub shaft 72.

The combination of the rods 67 and 68 bearing against the limiting blocks 65 and the coiled spring 70 results in an increase in the force required to rotate the shaft 29 as per the extent the shaft is rotated.

Thus, the above described detector 16 is capable of detecting movement of the trailer relative to the tractor and immediately positively rectifying the problem to prevent injury or harm. Once the trailer, and thus frame 22, move enough to cause the brush 51 to bridge, any two of the conductive strips 45, 46, and 47, activation of the braking mechanism 20 and correction of the movement is both immediate and automatic.

Although the specific braking mechanism utilized is not considered a critical part of the invention, a variety of acceptable systems are disclosed hereinafter.

Figure 5:
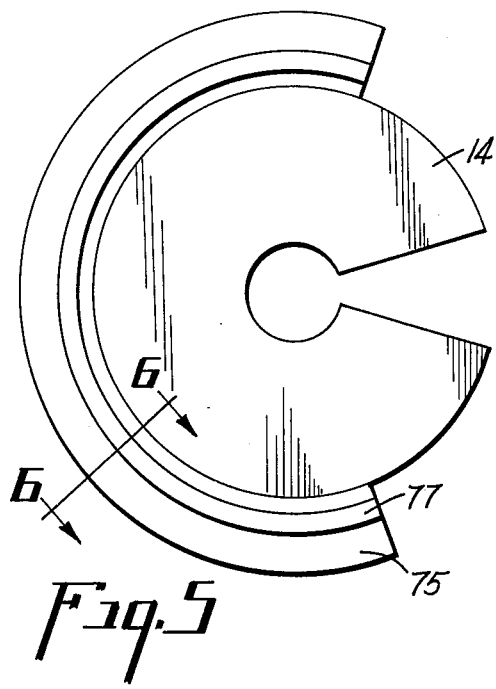
FIG. 5 is a plan view of one structure for use with this invention showing the tractor or truck portion of the fifth-wheel.
Figure 5A:
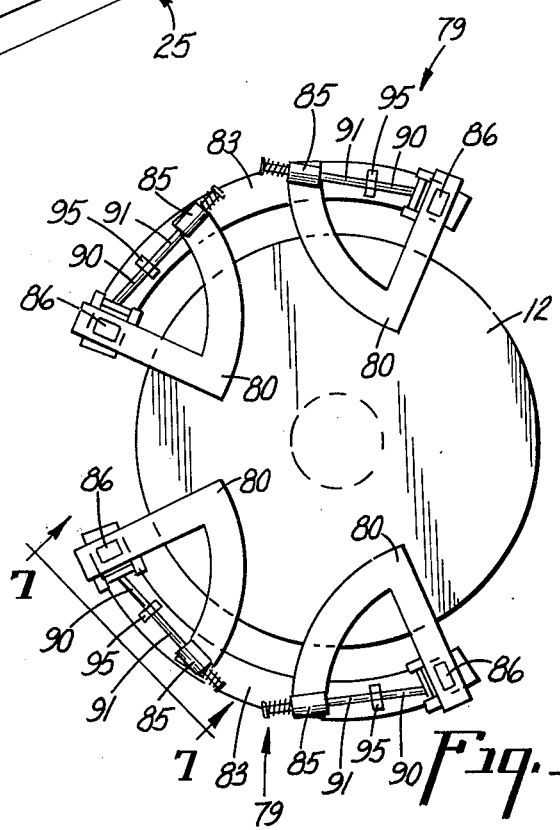
FIG. 5a is a plan view of the fifth-wheel structure, shown in FIG. 5 showing the portion on the trailer.
Figure 6:
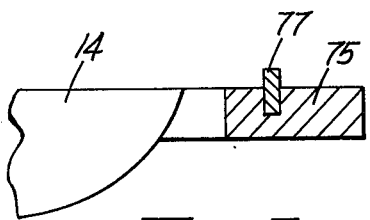
FIG. 6 is a partial cross sectional view of the fifth-wheel, truck portion, taken along line 6—6 of FIG. 5.

FIGS. 5 and 5a illustrate the trailer 12 and tractor 14 portions of the fifth-wheel, respectively, including one type of braking mechanism. FIG. 5 shows a semicircular ring 75 attached to the periphery of the tractor of the fifth-wheel. The ring 75 is divided into two portions by means of a semicircular oil seal 77 (shown in detail in FIG. 6). The purpose of the oil seal 77 is to assure that oil, grease and other deleterious matter does not reach the outermost radius of the ring 75. This surface is intended to be used as a frictional braking surface.

Figure 7:
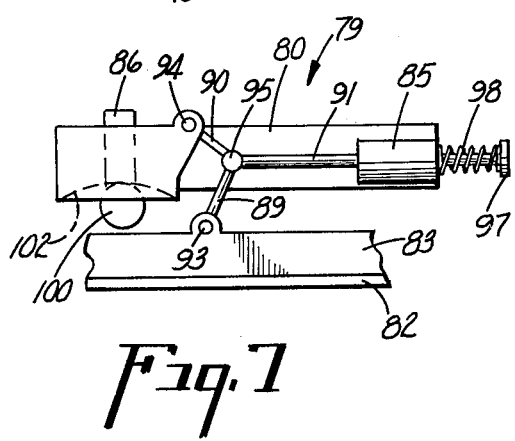

FIG. 5a, looking from the top of the trailer portion 12 of the fifth-wheel, includes a braking mechanism 79. The braking device 20 above-mentioned, includes generally the braking mechanism 79 and control devices for activating the mechanism 79. The braking mechanism 79 is securely attached to the trailer portion 12 by means of mounting brackets 80. A suitable brake facing 82 (FIG. 7) is fixedly secured to a pair of brake shoes 83 by any suitable means, such as bonding or riveting. The construction of the brake shoes 83 and brake facing 82 is such as to correspond substantially to the ring 75 on the tractor portion 14 of the fifth wheel.

With this particular braking mechanism 79, the braking may be affected either through automatic operation, which is one of the objects of this invention, or manually by the operator of the vehicle. For this reason, solenoids 85 for manual operation and electromagnets 86 for automatic operation are provided to cause the actuation of the braking mechanism 79 upon proper energization from the circuitry of the braking device 20.

The brake shoes 83 are attached to and supported by suitable rods 89, 90 and 91, respectively, through any commonly utilized connecting device, such as pins, clips or bolts (not illustrated in the figures). The rods 89, 90 and 91 are pivotable at points 93, 94 and 95, respectively.

When the operator of the tractor desires to manually control movement of the trailer relative to the tractor, actuation of a lever or control in the cab of the tractor results in the solenoids 85 being energized. In this case, the rod 91 is caused to move to the left (as viewed in FIG. 7). Since the pivot 94 is on the mounting bracket 80, its position is fixed and the movement of rod 91 results in the brake shoe 83 moving down toward the ring 75. Upon contact of the brake facing 82 and ring 75, the movement of the trailer ceases.

The right end of the rod 91 (as viewed in FIG. 7) has attached thereto a spacer 97 and a compression spring 98. The purpose of the spacer 97 is to limit the possible movement of the rod 91 and to retain the compression spring 98. The purpose of the compression spring 98 is to maintain the brake shoes 83 removed from the ring 75 by holding the rod 91 in its unenergized position.

When the detector 16 indicates to the braking device 20 that undesirable movement of the trailer relative to the tractor has occurred, the electromagnets 86 are automatically de-energized. Ordinarily, the electromagnets 86 are energized and thus cause rollers 100 to be attracted thereto. The rollers 100 are generally cylindrically shaped solid bars of ferrous metal. Upon signal from the circuitry of the braking device 20, the electromagnets 86 release the rollers 100.

At the lower end of the electromagnets 86 are cup-shaped supports 102. Once the rollers 100 have been released, the rollers fall to the upper surface of the brake shoes 83 where they are trapped between the brake shoes 83 and the cup-shaped supports 102. The weight of the rollers 100 upon the brake shoes 83 initially causes the brake facings 82 and the ring 75 to contact. This contact causes friction, and as a result, the brake shoes 83 move and result in the rollers 100 becoming wedged between the cup-shaped supports 102 and the brake shoes 83. This in turn results in more friction, increased wedging of the rollers 100 and thus greater stopping force.

It should be understood that cylinderical rollers are not the only possible element which may be used to cause the wedging of the brake shoes 83. Spherical objects may likewise be used in place of the rollers 100. Still another approach involves using objects held by the electromagnets 86 which have a lower face which is serrated. The upper surface of the brake shoes 83 would be likewise serrated at the corresponding positions. Thus, when the electromagnets 86 release the upper serrated object, the braking force is increased by the inability of the serrated objects to slide upon one another.

FIGS. 8 and 8a illustrate a tractor-trailer fifth-wheel braking mechanism adapted to be energized by the braking device 20 upon signal from the detector 16. In this case, attracting electromagnets are utilized. The tractor portion of the fifth-wheel 14 (FIG. 8) has an electromagnet 105 positioned below. The trailer portion 12 (FIG. 8a) has a corresponding, attracting electromagnet 106 positioned above. Clearly, when the electromagnets 105 and 106 are energized, the two portions of the fifth-wheel are attracted, thus causing friction and stopping undesired movement.

FIGS. 9 and 9a illustrate a tractor-trailer fifth-wheel braking mechanism adapted to be energized upon signals from the detector 16 using repelling electromagnets. Below the tractor portion of the fifth-wheel 14, are positioned, in this case, four electromagnets 109, 110, 111 and 112, respectively (FIG. 9). Above the trailer portion 12, positioned correspondingly, are four repelling electromagnets 114, 115, 116 and 117, respectively (FIG. 9a). When all the electromagnets in this case are appropriately energized, the repelling force causes the portions 12 and 14 of the fifth-wheel to likewise repel with a resultant binding and thus frictional force.

Finally, FIGS. 10 and 10a illustrate a braking mechanism that is air operated rather than electric. On opposite sides of the trailer portion of the fifth-wheel 12 (FIG. 10a), a catch 120 with an interconnected shock absorber 121 is securely attached. The tractor portion 14 (FIG. 10) has affixed thereunder two bars 124 which are hingedly connected at the midpoint of the portion 14. At an extreme end of each bar 124 is positioned a stake 125. The distance between the stakes 125 is precisely identical to the distance between the catches 120 on the trailer portion 12. The bars 124 are enclosed in an airtight container 126 having an air inlet 127. The air inlet 127 is in turn connected to an air switch 128 through appropriate connections.

When the detector 16 indicates undesired movement is occurring, the braking device 20 causes an air supply (not shown) to be connected to the air switch 128 and, consequently, the airtight container 126. The bar 124 and stake 125 shown in solid lines in FIG. 11 represent an at rest position for the braking mechanism. As soon as air pressure builds up within the airtight container 126, the bars 124 and, consequently, the stakes 125 are lifted to the position shown in phantom lines in FIG. 11. In this position, when the trailer attempts to move, laterally, the stakes 125 are held by the catches 120 and thus the trailer is restrained from further movement.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather

What is claimed is:

1. An apparatus mounted on the trailer of a tractor-trailer rig having a fifth-wheel hitching mechanism, for preventing undesirable trailer movements through timely application of a mechanical braking mechanism, comprising support means securely attached to said trailer, axle means rotatably mounted in said support means, gyroscopic means mounted on said axle means, first electrical contact means attached to said axle means, and second electrical contact means mounted on said support means whereby the relative positions of said first electrical contact means and said second electrical contact means result in electrical signals being applied to said mechanical braking mechanism.

2. An apparatus mounted on the trailer of a tractor-trailer rig having a fifth-wheel hitching mechanism, for preventing undesirable trailer movements through timely application of a mechanical braking mechanism, comprising support means securely attached to said trailer, axle means rotatably mounted in said support means, an electrically operated motor mounted gimbal fashion on said axle means, an output shaft of said electrically operated motor arranged perpendicular to said axle means, flywheel means securely attached to the said output shaft, first electrical contact means attached to said axle means, and second electrical contact means permanently positioned on said support means whereby the relative positions of the said first electrical contact means and said second electrical contact means result in electrical signals being applied to said mechanical braking mechanism.

3. The apparatus according to claim 2 in which the mechanical braking mechanism is operated directly by the electrical signals.

4. The apparatus according to claim 2 in which the mechanical braking mechanism is operated indirectly through an air operated device activiated by the electrical signals.

5. A device for sensing movements of a trailer relative to the tractor of a tractor-trailer rig having a fifth-wheel hitching mechanism, comprising support means securely attached to said trailer, axle means rotatably mounted in said support means, an electrically operated motor mounted gimbal fashion on said axle means, an output shaft of said electrically operated motor arranged perpendicular to the said axle means, flywheel means securely attached to the said output shaft, electrical brush means attached to said axle means and electrical contact means attached to said support means whereby the movements of the trailer are determined as a function of the positions of the electrical brush means relative to the electrical contact means.

6. The device according to claim 5 in which restraining means for limiting the rotation of the said axle means, and thus, the electrical brush means, is permanently attached to the said axle means at a point removed from said electrically operated motor.

7. A method of preventing undesirable movements of a trailer relative to a tractor of a tractor-trailer rig having a fifth-wheel hitching mechanism, comprising supporting a detecting means from the trailer, mounting an electrically operated motor gimbal fashion on an axle rotatably mounted on the detecting means, providing flywheel means on an output shaft of said electrically operated motor at a constant speed, attaching electrical brush means to the axle mounting said electrically operated motor, and positioning electrical contact means stationary relative to the trailer in the vicinity of said electrical brush means whereby movement of the trailer results in corresponding movement of the electrical brush means and electrical contact means relative to one another.

8. The method according to claim 7 further comprising limiting the rotation of said axle, and thus, said electrical brush means, by providing resistance means on the said axle allowing only a predetermined amount of rotation.

9. An apparatus mounted on the trailer of a tractor-trailer rig having a fifth-wheel hitching mechanism, for preventing undesirable trailer movements, comprising a mechanical braking mechanism, support means securely attached to said trailer, discontinuous axle means rotatably mounted in said support means, an electrically operated motor mounted on said discontinuous axle means at the discontinuous portion thereof, an output shaft of said electrically operated motor arranged perpendicular to said discontinuous axle means, flywheel means securely attached to the said output shaft, electrical brush means attached to said discontinuous axle means, electrical contact means permanently positioned on said support means in the vicinity of said electrical brush means, and restraining means attached to said discontinuous axle means for limiting the rotation of said discontinuous axle means relative to said support means, whereby the positions of the electrical brush means and electrical contact means relative to one another result in electrical signals being applied to said mechanical braking mechanism.

10. The apparatus according to claim 9 in which said electrical contact means further includes at least three independent electrical contacts and the electrical connection of any two said electrical contacts by the electrical brush means results in a predetermined activation of said mechanical braking mechanism.

11. The apparatus according to claim 10 in which the independent electrical contacts are arranged in one radial arc with respect to the said discontinuous axle means such that the electrical brush means is positioned only in contact with the center electrical contact when the trailer is not rotating relative to the tractor.

12. The apparatus according to claim 11 in which the electrical brush means comprises a smaller arc length than does the center electrical contact.

13. The apparatus according to claim 10 in which said mechanical braking mechanism comprises a frictional braking device activated by the electrical signals produced by the electrical brush means and electrical contact means.

14. The apparatus according to claim 10 in which said mechanical braking mechanism comprises electromagnetic devices integral within at least one of either the tractor or trailer portion of said fifth-wheel hitching device.

15. The apparatus according to claim 10 in which the mechanical braking mechanism comprises an air pressure opeated mechanical latching device energized by the electrical signals produced by the said electrical brush means and electrical contact means.

* * * * *